United States Patent [19]

Ishida et al.

[11] Patent Number: 5,290,851
[45] Date of Patent: Mar. 1, 1994

[54] ROOM TEMPERATURE-CURABLE ORGANOPOLYSILOXANE COMPOSITION

[75] Inventors: Tadao Ishida; Miyoji Fukayama; Noriyuki Suganuma, all of Chiba, Japan

[73] Assignee: Dow Corning Toray Silicone, Ltd., Tokyo, Japan

[21] Appl. No.: 828,273

[22] Filed: Jan. 30, 1992

[30] Foreign Application Priority Data

Jan. 30, 1991 [JP] Japan ................... 3-056216

[51] Int. Cl.⁵ ............... C08K 5/24; C08K 3/36
[52] U.S. Cl. .................. 524/731; 524/847; 524/863
[58] Field of Search .............. 524/847, 863, 731

[56] References Cited

U.S. PATENT DOCUMENTS

| | | | |
|---|---|---|---|
| 3,037,933 | 6/1962 | Wright | 252/28 |
| 4,101,499 | 7/1978 | Herzig | 524/731 |
| 4,104,239 | 8/1978 | Bargain et al. | 260/375 B |
| 4,384,068 | 5/1983 | Bouverot et al. | 524/588 |
| 4,912,153 | 3/1990 | Jeremias et al. | 524/731 |
| 4,956,436 | 9/1990 | Letoff et al. | 524/863 |
| 5,023,288 | 6/1991 | Hirai et al. | 524/731 |
| 5,145,932 | 9/1992 | Sasaki et al. | 524/731 |

OTHER PUBLICATIONS

European Search Report for EP 92 101478 Datum/-Date Sep. 8, 1992.
European Abstract 449651.
European Abstract 25092.

Primary Examiner—John C. Bleutge
Assistant Examiner—Karen A. Dean
Attorney, Agent, or Firm—Roger H. Borrousch

[57] ABSTRACT

A room temperature-curable organopolysiloxane composition which does not suffer from surface fissuring even when subjected to external stress (e.g., tensile stress, flexural stress) during the course of its cure was prepared and has a composition of a hydroxyl-terminated polydiorganosiloxane, a hydrophobic silica with a silanol titer not exceeding 2.0 mL, a dry-method silica with a silanol titer of at least 5.0 mL, and an oxime group-containing silane or siloxane.

20 Claims, 1 Drawing Sheet

ROOM TEMPERATURE-CURABLE ORGANOPOLYSILOXANE COMPOSITION

BACKGROUND OF THE INVENTION

1. Technical Field

This invention relates to a room temperature-curable organopolysiloxane composition, and, more particularly, relates to a room temperature-curable organopolysiloxane composition which does not suffer from fissuring or cracking when its adherend (substrate) undergoes movement during the course of its cure.

2. Prior Art and Problems to Be Solved by the Invention

Room temperature-curable organopolysiloxane compositions have a number of excellent properties, and as a result are employed as sealants and adhesives in various fields, for example, in civil engineering and construction, in general industry for machinery and tools, and in the electrical and electronics sectors. A problem associated with this type of composition is the development of surface fissuring when the composition is subjected to external stress (e.g., tensile stress, flexural stress) during the course of its cure.

As a result, the substrate or device carrying the room temperature-curable organopolysiloxane composition cannot be moved until the composition has undergone some degree of curing and surface skin strength has developed. This requires a long, disturbance-free holding period.

The present inventors carried out extensive investigations directed at solving this problem, and as a result they discovered that this problem can be solved in a single stroke by the addition of a specific type of hydrophobic silica to room temperature-curable organopolysiloxane compositions. The present invention was developed based on this finding.

SUMMARY OF THE INVENTION

The present invention takes as its object the introduction of a room temperature-curable organopolysiloxane composition which will not suffer from surface fissuring even when subjected to external stress (e.g., tensile stress, flexural stress) during the course of its cure.

The present invention relates to a room temperature-curable organopolysiloxane composition comprising (A) 100 parts by weight a hydroxyl-terminated polydiorganosiloxane with a viscosity=0.5 to 500 Pa.s at 25° C.; (B) 5 to 50 parts by weight hydrophobic silica whose silanol titer does not exceed 2.0 mL wherein said silanol titer is determined as follows: 2.0 g sample is dispersed in a mixture of 25 mL ethanol and 75 mL 20 weight % aqueous NaCl, and the quantity of 0.1 N aqueous sodium hydroxide solution required to change the pH of this dispersion from 4.0 to 9.0 is designated as the silanol titer; (C) 2 to 10 parts by weight dry-method silica whose silanol titer is at least 5.0 mL wherein said silanol titer is defined in (B); and (D) 0.5 to 25 parts by weight silane or siloxane which contains at least 3 oxime groups in each molecule.

BRIEF DESCRIPTION OF THE DRAWINGS

FIG. 1 shows the test set up for measurement of surface fissuring. FIG. 2 shows a test position after experiencing some stress on the curing room temperature-curable organopolysiloxane composition.

Figure 1:
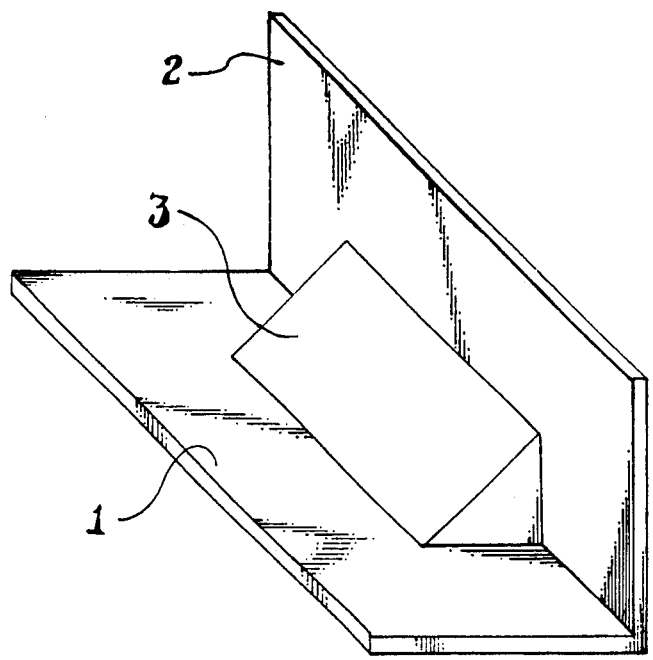
FIGS. 1 and 2 illustrate the method for determining the development of surface fissuring in the room temperature-curable organopolysiloxane composition.

1=adherend wall 1
2=adherend wall 2
3=room temperature-curable organopolysiloxane composition

DETAILED DESCRIPTION OF THE EMBODIMENTS OF THE INVENTION

The polydiorganosiloxane comprising component (A) employed by the present invention is the principal or base component of the composition. Its molecular chain terminals must be end-blocked with the hydroxyl group, and its viscosity at 25° C. must fall within the range of 0.5 to 500 Pa.s (Pascal.seconds). This polydiorganosiloxane is exemplified by alpha,omega-dihydroxy polydiorganosiloxanes with the following general formula $HO(R_2SiO)_nH$ wherein R encompasses substituted and unsubstituted monovalent hydrocarbon groups and each R may be identical or may differ, and n has a value which provides this polydiorganosiloxane with a viscosity at 25° C. within the range of 0.5 to 500 Pa.s, preferably from 1 to 100 Pa.s. R in the preceding formula encompass monovalent hydrocarbon groups as exemplified by chain alkyl groups such as methyl, ethyl, isopropyl, hexyl, and octadecyl; alkenyl groups such as vinyl, allyl, and hexenyl; cycloalkyl groups such as cyclohexyl and cyclopentyl; alkaryl groups such as benzyl and beta-phenylethyl; and aromatic hydrocarbon groups such as phenyl, xenyl, naphthyl, tolyl, and xylyl. R in the preceding formula also encompasses the substituted hydrocarbon groups which are generated by replacing hydrogen in the aforesaid monovalent hydrocarbon groups with an organic group such as beta-cyanoethyl, 3,3,3-trifluoropropyl, and perfluorobutyl. The preferred silanol-terminated polydiorganosiloxane is silanol-terminated polydimethylsiloxane and especially those which have a viscosity of from 1 to 100 Pa.s at 25° C.

The hydrophobic silica comprising the component (B) used by the present invention endows the composition according to the present invention with the unique property to the effect that surface fissuring will not occur even when the composition is subjected to external stress (e.g., tensile stress, flexural stress) during its cure. This hydrophobic silica must have a silanol titer of no more than 2.0 mL as measured by the silanol quantification method stipulated by the present invention. The silanol titer as specified by the present invention is determined as follows: 2.0 g of the silica (sample) is dispersed in a mixture of 25 mL ethanol and 75 mL 20 weight % aqueous NaCl, and the silanol titer corresponds to the amount of 0.1N aqueous sodium hydroxide required to change the pH of this dispersion from 4.0 to 9.0. This type of hydrophobic silica may be prepared by subjecting the silica micropowders customarily employed as reinforcing fillers for silicone rubber compositions to surface treatment with any of various types of hydrophobicizing agents. Said silica micropowders are exemplified by dry-method silicas, as typified by fumed silica, and by wet-method silicas, as typified by precipitated silica. Dry-method silicas are preferred for the present invention. The hydrophobicizing agents are exemplified by hexamethyldisilazane, trimethylchlorosilane, polyorganohydrogensiloxanes, and polydimethylsiloxanes. These hydrophobicizing agents act to hydrophobicize the silica micropowder by reacting with the silanol groups on the surface of the silica micropowder and thus bonding with the surface of the silica micropowder. In order to treat the surface of silica micropowder with such a hydrophobicizing agent, the hydrophobicizing agent may be, for example, added to the silica micropowder followed by mixing to homogeneity and then heating. Or, the hydrophobicizing agent may be added to the silica micropowder while stirring and heating the latter.

When heating is carried out in this treatment in the absence of any mixing, the hydrophobicization treatment will not be uniform due to the low vapor pressures of the hydrophobicizing agents. On the other hand, the structure of the silica micropowder is destroyed and its bulk density is increased by extremely vigorous mixing, and the fluidity improvement afforded by silica micropowder is thereby diminished. Gentle mixing conditions are preferred as a result.

Preferred heating temperatures fall within the range of 100° to 200° C. Moreover, the hydrophobic silica comprising component (B) preferably has a specific surface area of at least 100 $m^2/g$. This component should be added at 5 to 50 parts by weight per 100 parts by weight (A), preferably from 5 to 25 parts by weight per 100 parts by weight of (A). The functional effect described above does not appear at less than 5 parts by weight, while the addition of more than 50 parts by weight causes a reduction in the extrudability of the room temperature-curable organopolysiloxane composition according to the present invention from its storage container.

Through its combined use with the hydrophobic silica of component (B), dry-method silica of component (C) is employed by the present invention and functions to endow the composition according to the present invention with a nonsag character (nonstringing character) while at the same time providing the composition with the ability to remain free of surface fissuring when subjected to external stress during its cure. This dry-method silica must have a silanol titer of at least 5.0 mL. The dry-method silica under consideration is exemplified by fumed silica, which is produced by the decomposition of silicon tetrachloride, and by arc silica, which is produced by the arc heating of a mixture of quartz sand and coke. Fumed silica is commercially available, for example, under the following tradenames: Aerosil 130, 200, 300, 380, TT-600, MOX-80, and MOX170, from Nippon Aerosil Kabushiki Kaisha (Japan); Cabosil M-5, MS-7, MS-75, HS-7, ET-5, HS-5, and ET-5 from the Cabot Corporation (United States); and HDK N20, V15, T30, and T40 from Wacker Chemie (West Germany). This component should be added at 2 to 10 parts by weight per 100 weight parts component (A). The nonsag character is diminished at additions less than 2 parts by weight, while the fissuring described above readily occurs when 10 parts by weight is exceeded.

The oxime-containing silane or siloxane of component (D) is employed by the present invention to function as a crosslinker for the composition according to the present invention. (D) is exemplified by methyltris(methylethylketoximo)silane, vinyltris(methylethylketoximo)silane, phenyltris(methylethylketoximo)silane, methyltris(diethylketoximo)silane, tetrakis(methylethylketoximo)silane, and the partial hydrolyzates of the preceding. The amount of silane or siloxane of component (D) is from 0.5 to 25 parts by weight per 100 parts by weight of (A). Preferably, (D) is present in an amount of from 1 to 20 parts by weight per 100 parts by weight of (A). The preferred (D) are vinyltris(methylethylketoximo)silane, methyltris(methylethylketoximo)silane, and mixtures thereof.

The room temperature-curable organopolysiloxane composition according to the present invention comprises components (A) through (D) as described herein, but in a preferred execution it additionally contains an organoalkoxysilane, component (E), which is an epoxy-containing organoalkoxysilane, an amino-containing organoalkoxysilane, or a reaction product of the epoxy-containing organoalkoxysilane and the amino-containing organoalkoxysilane. The epoxy-containing organoalkoxysilanes are exemplified by gamma-glycidoxypropyltrimethoxysilane and beta-(3,4-epoxycyclohexyl)ethyltrimethoxysilane. The amino-containing organoalkoxysilanes are exemplified by gamma-aminopropyltrimethoxysilane, gamma-aminopropyltriethoxysilane, and N-beta-(aminoethyl)-gamma-aminopropyltrimethoxysilane; and by their partial hydrolyzates and reaction products. The aforesaid reaction product is prepared by reacting a mixture of epoxy-containing organoalkoxysilane and amino-containing organoalkoxysilane at room temperature or with heating.

Component (E) provides the composition according to the present invention with adhesiveness for various types of substrates while at the same time further enhancing the composition's ability to remain free of surface fissuring when subjected to external stress (e.g., tensile stress, flexural stress) during its cure. Component (E) is added at 0.5 to 10 parts by weight per 100 weight parts component (A), preferably from 0.5 to 5 parts by weight.

The composition according to the present invention may optionally contain, component (F), a catalyst in order to accelerate its cure. Typical catalysts in this regard are lead 2-ethyloctoate, dibutyltin diacetate, dibutyltin 2-ethylhexoate, dibutyltin dilaurate, butyltin tri-2-ethylhexoate, and dibutyltin acetylacetonate. The preferred catalysts are dialkyltin dicarboxylates, such as dibutyltin dilaurate, dibutyltin 2-ethylhexoate, and dibutyltin diacetate. Component (F) is added at 0.001 to 10 parts by weight, preferably 0.01 to 5 parts by weight per 100 parts by weight of (A).

The composition according to the present invention is prepared simply by mixing components (A) through (D) or components (A) through (E), optionally along with the cure-accelerating catalyst (F). The composition according to the present invention may also contain those additives already known for application with room temperature-curable organopolysiloxane compositions insofar as the object of the present invention is not impaired. Examples in this regard are the various organic solvents; fluidity adjuster such as low-molecular-weight organopolysiloxane, illustrated by silanol-terminated poly(dimethylsiloxane-co-phenylmethylsiloxane) having a viscosity of less than 0.1 Pa.s at 25° C.; various types of fillers and pigments such as magnesium oxide, alumina, zinc oxide, and iron oxide; flame retardants such as manganese carbonate; heat stabilizers such as cerium hydroxide and cerium oxide; and adhesion promoters such as silane coupling agents.

The present invention is explained in greater detail below through illustrative examples. In the examples and comparison examples, parts=parts by weight, and the viscosity is the value measured at 25° C. The properties were measured using the following test methods.

EXTRUDABILITY

The room temperature-curable organopolysiloxane composition was filled into a 2 mL (milliliter) syringe, and the time required to extrude the entire quantity of the composition using a pressure of 2 kg/cm$^2$ is reported in seconds.

RUBBER PROPERTIES

The room temperature-curable organopolysiloxane composition was cured at room temperature for 7 days in order to produce a 3 mm-thick silicone rubber sheet, and the physical properties (hardness, tensile strength, elongation) of this silicone rubber sheet were measured in accordance with JIS K 6301.

MEASUREMENT OF SURFACE FISSURING

Figure 2:
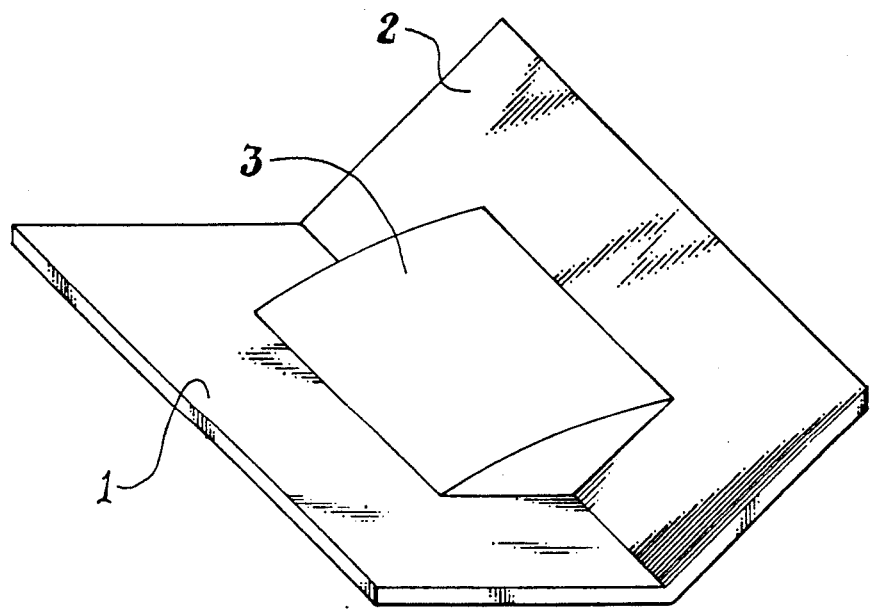

In order to measure surface fissuring, the room temperature-curable organopolysiloxane composition 3 was applied between adherend wall 1 and adherend wall 2 in the test set-up depicted in FIG. 1. Then, after the specified period of time, adherend wall 2 was moved while holding adherend wall 1 stationary (as shown in FIG. 2) until the angle between adherend wall 1 and adherend wall 2 was 180 degrees. The surface of the room temperature-curable organopolysiloxane composition 3 was then inspected using a magnifying glass for the presence of fissuring or cracking.

EXAMPLE 1

A base was prepared by mixing to homogeneity into 100 parts alpha, omega-dihydroxy polydimethylsiloxane with viscosity=13 Pa.s: 14.3 parts hydrophobic silica with silanol titer=0.81 mL and specific surface area=200 m$^2$/g (prepared by hydrophobicizing the surface of dry-method silica by treatment with hexamethyldisilazane); 5.7 parts dry-method silica (non-hydrophobicized) with silanol titer=9.11 mL and specific surface area=200 m$^2$/g; and 2.1 parts silanol-terminated poly(dimethylsiloxane-co-methylphenylsiloxane) with viscosity=10$^{-5}$ m$^2$/s (fluidity adjuster).

100 Parts of the base thus obtained was mixed to homogeneity while excluding moisture with 4.6 parts vinyltris(methylethylketoximo)silane, 3.0 parts methyltris(methylethylketoximo)silane, 1.5 parts gamma-glycidoxypropyltrimethoxysilane, and 0.3 part dibutyltin dilaurate to form a single-package room temperature-curable organopolysiloxane composition. This composition was sealed into aluminum tubes.

This composition was subsequently investigated with regard to extrudability, appearance of surface fissures, and post-cure rubber properties (hardness, tensile strength, and elongation), and the results were as reported in the Table.

EXAMPLE 2

A base was prepared by mixing to homogeneity into 100 parts alpha,omega-dihydroxypolydimethylsiloxane with viscosity=12 Pa.s: 14.3 parts hydrophobic silica with silanol titer=1.20 mL and specific surface area=200 m$^2$/g (prepared by hydrophobicizing the surface of dry-method silica by treatment with hexamethyldisilazane) and 5.7 parts dry-method silica (non-hydrophobicized) with silanol titer=9.11 mL and specific surface area=200 m$^2$/g.

100 Parts of the base thus obtained was mixed to homogeneity while excluding moisture with 7.6 parts vinyltris(methyl ethyl ketoxime)silane, 1.5 parts N-beta(aminoethyl)-gamma-aminopropyltrimethoxysilane, and 0.3 part dibutyltin dilaurate to form a single-package room temperature-curable organopolysiloxane composition. This composition was sealed into aluminum tubes. The composition was subsequently investigated with regard to extrudability, appearance of surface fissures, and post-cure rubber properties (hardness, tensile strength, and elongation), and the results were as reported in the Table.

EXAMPLE 3

A base was prepared by mixing to homogeneity into 100 parts alpha,omega-dihydroxy polydimethylsiloxane with viscosity=13 Pa.s: 10.7 parts hydrophobic silica with silanol titer=0.38 mL and specific surface area=100 m$^2$/g (prepared by hydrophobicizing the surface of dry-method silica by treatment with dimethylpolysiloxane with viscosity=100 centistokes), 3.6 parts dry-method silica (non-hydrophobicized surface) with silanol titer=8.55 mL and specific surface area=200 m$^2$/g, and 3.1 parts silanol-terminated poly(dimethylsiloxane-comethylphenylsiloxane) with viscosity=10$^{-5}$ m$^2$/s (fluidity adjuster).

100 Parts of the base thus obtained was mixed to homogeneity while excluding moisture with 4.6 parts vinyltris(methylethylketoximo)silane, 3.0 parts methyltris(methylethylketoximo)silane, 1.5 parts N-beta(aminoethyl)-gamma-aminopropyltrimethoxysilane, and 0.3 part dibutyltin dilaurate to form a single-package room temperature-curable organopolysiloxane composition. This composition was sealed into aluminum tubes.

This composition was subsequently investigated with regard to extrudability, appearance of surface fissures, and post-cure rubber properties (hardness, tensile strength, and elongation), and the results were as reported in the Table.

COMPARISON EXAMPLE 1

A single-package room temperature-curable organopolysiloxane composition was prepared as in Example 1, but in the present case using dry-method silica with silanol titer=9.11 mL in place of the hydrophobic silica with silanol titer=0.81 mL used in Example 1. The properties of this composition were measured as in Example 1, and the results were as reported in the Table.

COMPARISON EXAMPLE 2

A single-package room temperature-curable organopolysiloxane composition was prepared as in Example 1, but in the present case using a hydrophobic silica with silanol titer=3.63 mL and specific surface area=200 m$^2$/g (prepared by the hydrophobicization of the surface of dry-method silica by treatment with methyltrichlorosilane) in place of the hydrophobic silica with silanol titer=0.81 mL used in Example 1. The properties of this composition were measured as in Example 1, and the results were as reported in the Table.

COMPARISON EXAMPLE 3

A room temperature-curable composition was prepared as described in Example 1, except for replacing the dry process silica having a titer of 9.11 mL with the hydrophobic silica having a titer of 0.81 mL. The composition was evaluated as described in Example 1, and the results were as shown in the Table. This composition exhibited stringing whereas the composition of Example 1 did not exhibit any stringing.

TABLE

| PROPERTIES | Example 1 | Example 2 | Example 3 | Comp. Ex. 1 | Comp. Ex. 2 | Comp. Ex. 3 |
|---|---|---|---|---|---|---|
| Extrudability (sec/mL) | 40 | 47 | 47 | 72 | 71 | 29 |
| Surface fissuring test (see note 1) | | | | | | |
| after 1 minute | + | + | + | + | + | + |
| 10 minutes | + | + | + | x | x | + |
| 20 minutes | + | + | + | x | x | + |
| 30 minutes | + | + | + | x | x | + |
| 40 minutes | + | + | + | + | + | + |
| Post-cure properties | | | | | | |
| Hardness, JIS-A | 37 | 38 | 31 | 36 | 37 | 25 |
| Tensile strength (kg/cm2) | 31 | 32 | 22 | 26 | 30 | 30 |
| Elongation, % | 430 | 400 | 340 | 320 | 410 | 460 | note:
+ = no appearance of surface fissuring
x = appearance of surface fissuring

EFFECTS OF THE INVENTION

Because the room temperature-curable organopolysiloxane composition according to the present invention is composed of components (A) through (D) or (A) through (E), and in particular because it contains specific quantities of both the particular type of hydrophobic silica comprising component (B) and the particular type of dry-method silica comprising component (C), it characteristically will not develop surface fissuring even when subjected to external stress (e.g., tensile stress, flexural stress) during the course of its cure.

That which is claimed is:

1. A room temperature-curable organopolysiloxane composition comprising
   (A) 100 parts by weight a hydroxyl-terminated polydiorganosiloxane with a viscosity=0.5 to 500 Pa.s at 25° C.;
   (B) 5 to 50 parts by weight hydrophobic silica whose silanol titer does not exceed 2.0 mL wherein said silanol titer is determined as follows: 2.0 g sample is dispersed in a mixture of 25 mL ethanol and 75 mL 20 weight % aqueous NaCl, and the quantity of 0.1N aqueous sodium hydroxide solution required to change the pH of this dispersion from 4.0 to 9.0 is designated as the silanol titer;
   (C) 2 to 10 parts by weight dry-method silica whose silanol titer is at least 5.0 mL wherein said silanol titer is defined in (B); and
   (D) 0.5 to 25 parts by weight silane or siloxane which contains at least 3 oxime groups in each molecule.

2. The room temperature-curable organopolysiloxane composition according to claim 1 further comprising
   (E) 0.5 to 10 parts by weight parts of an organoalkoxysilane selected from the group consisting of epoxy-containing organoalkoxysilane, amino-containing organoalkoxysilane, and a reaction mixture thereof.

3. The room temperature-curable organopolysiloxane composition according to claim 1 further comprising
   (F) a catalyst to accelerate the cure.

4. The room temperature-curable organopolysiloxane composition according to claim 3 further comprising
   (F) a catalyst to accelerate the cure.

5. The room temperature-curable organopolysiloxane composition according to claim 1 in which the polydiorganosiloxane of (A) is polydimethylsiloxane which has a viscosity of 1 to 100 Pa.s, (B) is present in an amount of from 5 to 25 parts by weight per 100 parts by weight of (A), and (D) is present in an amount of from 1 to 20 parts by weight per 100 parts by weight of (A).

6. The room temperature-curable organopolysiloxane composition according to claim 2 in which the polydiorganosiloxane of (A) is polydimethylsiloxane which has a viscosity of 1 to 100 Pa.s, (B) is present in an amount of from 5 to 25 parts by weight per 100 parts by weight of (A), (D) is present in an amount of from 1 to 20 parts by weight per 100 parts by weight of (A), and (E) is present in an amount of from 0.5 to 5 parts by weight per 100 parts by weight of (A).

7. The room temperature-curable organopolysiloxane composition according to claim 3 in which the polydiorganosiloxane of (A) is polydimethylsiloxane which has a viscosity of 1 to 100 Pa.s, (B) is present in an amount of from 5 to 25 parts by weight per 100 parts by weight of (A), (D) is present in an amount of from 1 to 20 parts by weight per 100 parts by weight of (A), and (F) is present in an amount of from 0.001 to 10 parts by weight per 100 parts by weight of (A).

8. The room temperature-curable organopolysiloxane composition according to claim 7 in which (F) is present in an amount of from 0.01 to 5 parts by weight per 100 parts by weight of (A).

9. The room temperature-curable organopolysiloxane composition according to claim 4 in which the polydiorganosiloxane of (A) is polydimethylsiloxane which has a viscosity of 1 to 100 Pa.s, (B) is present in an amount of from 5 to 25 parts by weight per 100 parts by weight of (A), (D) is present in an amount of from 1 to 20 parts by weight per 100 parts by weight of (A), and (E) is present in an amount of from 0.5 to 5 parts by weight per 100 parts by weight of (A), and (F) is present in an amount of from 0.01 to 5 parts by weight per 100 parts by weight of (A).

10. The room temperature-curable organopolysiloxane composition according to claim 1 in which (D) is a silane selected from the group consisting of vinyltris(methylethylketoximo)silane, methyltris(methylethylketoximo)silane, and mixtures thereof.

11. The room temperature-curable organopolysiloxane composition according to claim 5 in which (D) is a silane selected from the group consisting of vinyltris(methylethylketoximo)silane, methyltris(methylethylketoximo)silane, and mixtures thereof.

12. The room temperature-curable organopolysiloxane composition according to claim 8 in which (D) is a silane selected from the group consisting of vinyltris(methylethylketoximo)silane, methyltris(methylethylketoximo)silane, and mixtures thereof.

13. The room temperature-curable organopolysiloxane composition according to claim 9 in which (D) is a silane selected from the group consisting of vinyltris(methylethylketoximo)silane, methyltris(methylethylketoximo)silane, and mixtures thereof.

14. The room temperature-curable organopolysiloxane composition according to claim 13 in which the silane of (D) is vinyltris(methylethylketoximo)silane.

15. The room temperature-curable organopolysiloxane composition according to claim 13 in which the silane of (D) is a mixture of vinyltris(methylethylketoximo)silane and methyltris(methylethylketoximo)silane.

16. The room temperature-curable organopolysiloxane composition according to claim 15 in which the organoalkoxysilane of (E) is gamma-glycidoxypropyltrimethoxysilane.

17. The room temperature-curable organopolysiloxane composition according to claim 14 in which the organoalkoxysilane of (E) is N-beta-(aminoethyl)-gamma-aminopropyltrimethoxysilane.

18. The room temperature-curable organopolysiloxane composition according to claim 15 in which the organoalkoxysilane of (E) is N-beta-(aminoethyl)-gamma-aminopropyltrimethoxysilane.

19. The room temperature-curable organopolysiloxane composition according to claim 16 further comprising a fluidity adjuster.

20. The room temperature-curable organopolysiloxane composition according to claim 19 in which the fluidity adjuster is a silanol-terminated poly(dimethylsiloxane-comethylphenylsiloxane) having a viscosity of less than 0.1 Pa.s at 25° C.

* * * * *